Aug. 10, 1965       T. J. CRAWFORD       3,200,234
ELECTRIC PERCUSSION-WELDING OF SURFACE LAYERS
Filed March 29, 1962                     2 Sheets-Sheet 1

FIG I

INVENTOR.
THOMAS J. CRAWFORD
BY
Oberlin, Maky & Donnelly
ATTORNEYS

Aug. 10, 1965 T. J. CRAWFORD 3,200,234
ELECTRIC PERCUSSION-WELDING OF SURFACE LAYERS
Filed March 29, 1962 2 Sheets-Sheet 2

INVENTOR.
THOMAS J. CRAWFORD
BY
Oberlin, Maky & Donnelly
ATTORNEYS

United States Patent Office 3,200,234
Patented Aug. 10, 1965

3,200,234
ELECTRIC PERCUSSION-WELDING OF SURFACE LAYERS
Thomas J. Crawford, Gaylord, Mich., assignor to Union Carbide Corporation, a corporation of New York
Filed Mar. 29, 1962, Ser. No. 183,665
4 Claims. (Cl. 219—76)

This invention relates to percussion welding of surface layers in which sparking created by capacitor discharge causes thin layer metal or metallic compound deposition on metallic or electro-conducting workpieces.

Heretofore, capacitor-discharge methods have been employed in metal deposition for hard surfacing certain tools such as drills, dies, punches, and metal cutting tool bits in general. The layer of hardening material deposited has generally been rough, greatly lacking in uniformity, and severely oxidized, and hardness of the underlying portion of the workpiece, essential to proper support of the thin coated surface, has often been degraded due to excessive heat from the deposition process. It has been especially difficult to apply such coatings close to or actually adjacent sharpened cutting edges, with this last difficulty greatly restricting the usefulness of the process. Some roughening of surface appears to be inevitable in a process employing a series of randomly overlapped weld-discharges, but this effect has been exaggerated in prior art by lack of control of the total energy dissipated in the individual discharges and the fact that, if the discharge circuit is oscillatory in character, which is generally desirable in order to obtain more efficient short-time discharge, a pulse of reverse polarity, i.e., with the workpiece positive, follows the main discharge. This tends to remove metal from the workpiece and transfer it to the electrode; the removal tends to take place from the hottest part of the workpiece surface and this is generally the site of a slightly cratered molten area just deposited, whereby the net effect is to deepen the craters.

Oxidation of the deposited material is a function of time at temperatures in an oxidizing range; if the capacitor is charged continually from a fixed power source through a current limiting resistor, as is the case with prior art techniques, the charging current, limited only by the aforesaid resistor, is available after the true capacitor discharge has ceased to maintain an arc (which I chose to term "after arc") between the electrode and the workpiece until the electrode has retracted far enough to extinguish this arc. This "after-arc" condition greatly increases the time-at-oxidizing temperature of the deposited material and greatly increases the heat input and consequently the temperature of the workpiece, with adverse effect on its hardness and ability to support the deposited layer.

The "after-arc" effect likewise severely limits the permissible minimum stroke length of the vibratory electrode, since enough retraction must take place to extinguish the "after-arc" and still allow time to recharge the capacitor before the next closure stroke initiates a new discharge cycle. Since the charging rate of the capacitor through a fixed resistor from a constant source is an exponential function of time, the actual potential reached by the capacitor on successive discharge cycles will vary exponentially with the time between the extinguishing of the "after-arc" and the time of initiation of the next succeeding discharge. Any tendency of the electrode or workpiece to "bounce" may greatly affect this time interval. Since the energy released in each discharge is proportional to the square of the capacitor potential, it is apparent that aforesaid variations must adversely affect the uniformity of deposition. This increases surface irregularity. It also, combined with "after-arc" heating, increases the noted difficulty in working adjacent to sharp edges of the workpiece, without severely impairing the keenness of such edges as well as their underlying hardness or strength.

It is accordingly a principal object of the present invention to provide capacitor-discharge weld depositing method and apparatus which will produce a more uniform, less oxidized, finished layer of metal or metallic compound on the surface of a workpiece accompanied by a minimum of deleterious thermal effect on the metallurgical properties of the underlying portion of the workpiece.

Another object is to provide such method and apparatus wherein the capacitor-discharge is oscillatory in the early and effective portion of the discharge interval, for high speed operation at safe and practical power levels, and non-oscillatory during the terminal portion of the interval, thereby to eliminate any pulse of reverse polarity following the main discharge.

It is also an object of the invention to provide, in such capacitor-discharge technique, positive protection against overcharging of the capacitor, that is, to a value in excess of a predetermined maximum.

A further object is to provide a system on the order indicated in which recharging of the capacitor for each succeeding cycle is blocked for a definite delay interval to eliminate the "after-arc" effect discussed above.

Other objects and advantages of the invention will become apparent as the following description proceeds.

To the accomplishment of the foregoing and related ends, the invention, then comprises the features hereinafter fully described and particularly pointed out in the claims, the following description and the annexed drawings setting forth in detail certain illustrative embodiments of the invention, these being indicative, however, of but a few of the various ways in which the principle of the invention may be employed.

Figure 1:
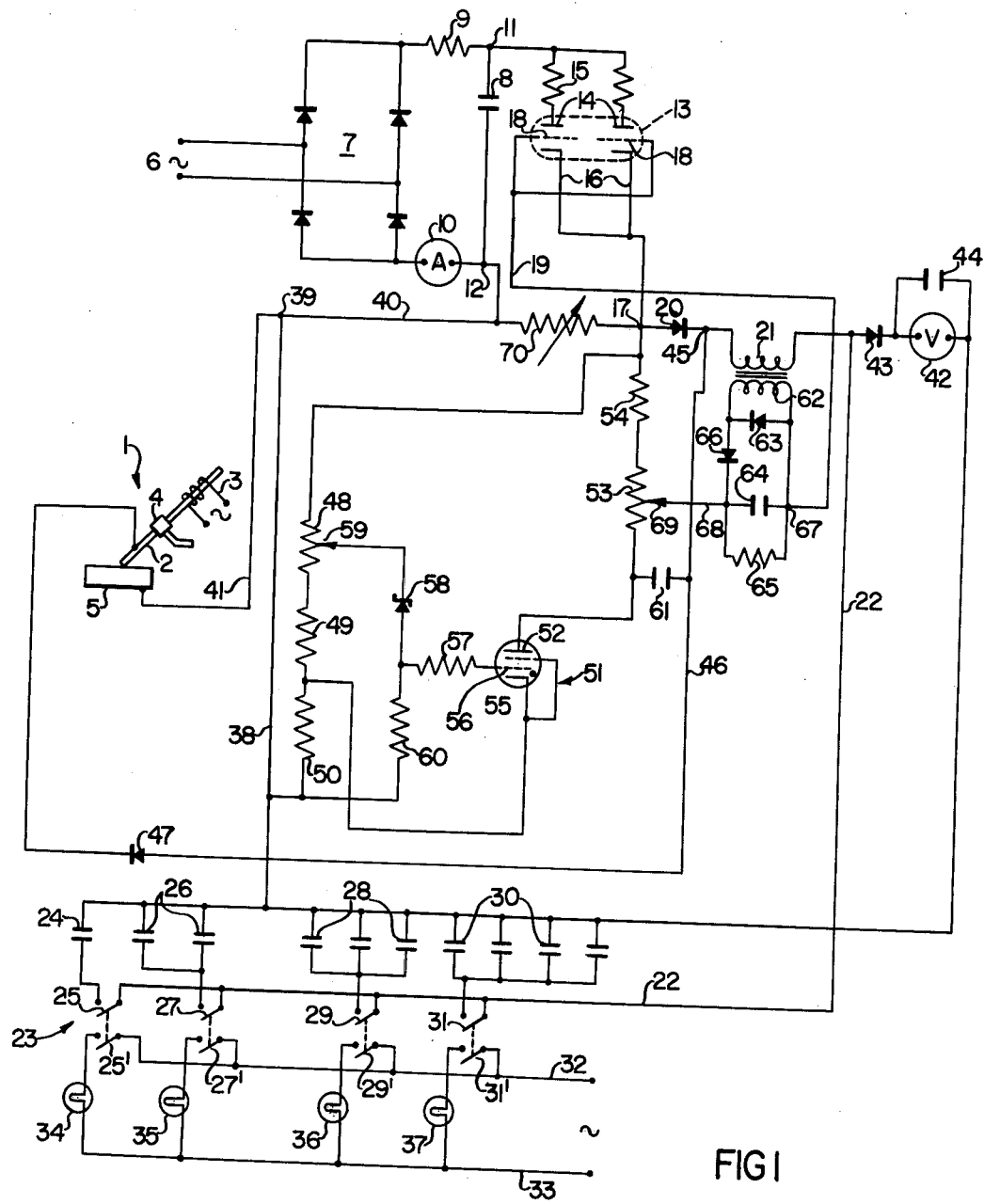
FIG. 1 is a wiring and schematic diagram of a capacitor-discharge system in accordance with the present improvements.

Referring now to the drawings in detail, reference numeral 1 designates generally a tool, preferably of hand tool form and shown here only schematically, comprising a hollow electrode 2 and a vibrator 3. There are of course several vibrator-type hand tools which are available and readily adaptable to use for practice of the present invention, by addition of the hollow electrode extension insofar as the tool itself is concerned, and it is preferred that the electrode be hollow for the supply of an inert gas therethrough, such for example as argon, with the fitting 4 and attached line shown to indicate such a gas supply. A workpiece is represented simply as a block 5, and it will be understood that spark discharge is desired between the same and the electrode to accomplish, in the preferred embodiment, deposition of the electrode material as an added and effective welded layer on the contacted surface of the workpiece.

It has been found that best results are obtained when the electrode is held at an angle of approximately 45° to the surface to receive the layer, for example, of hardening material, although satisfactory operation can be realized at angles within the range of from about 35° to about 50°. The electrode is rapidly vibrated against the surface and, with such an angle of approach, it tends to slide somewhat on the latter, that is, the surface receives glancing blows from the electrode, and formation of the deposit layer is thereby facilitated.

The present improvements are of course particularly concerned with the manner in which the spark energy is developed and controlled, using the capacitor discharge technique, and hence with the circuit of FIG. 1. Such circuit is shown as being energized from a suitable alternating current voltage source 6, with this input applied to a full-wave bridge rectifier 7. A capacitance 8, which may of course be a bank of capacitors in parallel, is connected to the output of rectifier 7 through a resistor 9 and an ammeter 10, and a direct current supply voltage is accordingly provided across the points or terminals 11 and 12, the former being positive.

A dual vacuum tube triode 13 has its plates 14 connected in parallel to the positive terminal 11, through plate resistors 15, and its cathodes 16, commonly connected to a convenient reference point for the circuit designated as 17. Grids 18 of the triode are also connected in parallel, with a common external wire 19 extending therefrom. In most cases, a plurality of such triodes will be used in multiple, but the connections and mode of operation are not thereby changed and it will be more convenient and sufficient to consider the single tube illustrated in the circuit. From the point 17, the triode cathode circuit proceeds serially through a metallic-oxide type of rectifier 20, the primary 21 of a transformer, and wire 22 to a grouping of capacitors designated generally by reference numeral 23. Such grouping serves, as will be more apparent hereinafter, to provide selected different values of capacitance for the spark discharge, and it comprises a first capacitor 24 connected to the wire 22 by a manual switch 25. A second value is provided by two capacitors 26 which can be connected in parallel to wire 22 by a further switch 27; three capacitors 28 in parallel and similarly connected by switch 29 provide the third value of capacitance; and the last value in the illustrated circuit is obtained by four capacitors 30 in parallel through a switch 31.

Each of the aforesaid switches 25, 27, 29 and 31 have respectively linked second switch sections indicated with corresponding primed numerals in a separate alternating current signal lamp circuit including the supply wires 32 and 33 and lamps 34, 35, 36 and 37. It will be seen that each lamp is associated with a particular capacitance group through the manual switches and accordingly that they provide visual indication of the operative condition of the full grouping and a combination selected from those available.

The other side of the capacitor grouping 23, there being a common connection of all individual capacitors at this side, is connected by a wire 38 to another convenient point 39. A wire 40 leads from the point 39 to the negative terminal 12, while another wire 41 extends from 39 to the workpiece 5. A peak reading direct current voltmeter 42, with an associated series metallic-oxide rectifier 43 and shunt capacitor 44, is connected between the wires 22 and 38 or across the capacitor grouping 23.

From a point 45, between the rectifier 20 and transformer primary winding 21, a wire 46 extends through a silicon diode 47 to the electrode 1. As will be explained hereinafter, the silicon diode 47 exhibits particular characteristics which are important to operation of system in the intended improved manner.

A voltage divider including resistors 48, 49 and 50 is connected between the point 17 and wire 38 or, in other words in the cathode circuit of triode 13 to the negative source terminal 12. A thyratron 51, with a cathode-connected screen grid, has its plate 52 connected through resistors 53 and 54 to the point 17 and its cathode 55 to the voltage divider between resistors 49 and 50. The control grid 56 of this thyratron, with a series resistor 57, is connected through a Zener diode 58 to an adjustable point 59 on the divider resistor 48, and, from the same first point at grid resistor 57, through a resistor 60 to wire 38. A capacitor 61 is bridged beween the wire 46 to the electrode and thyratron plate 52 ahead of the plate resistors 53 and 54.

A secondary transformer winding 62 is coupled to the aforesaid primary 21 and is shunted by a rectifier 63 in the direction indicated for a purpose which will later appear. A capacitor 64 and resistor 65 are connected in parallel through a series rectifier 66 across the secondary 62, and the wire 19 from the grids of triode 13 extends to one side of this transformer secondary circuit as shown at 67. A wire 68 leads from the other side of such circuit to an adjustable contact on the resistor 53 in the thyratron plate circuit.

An adjustable bleeder resistor 70 is connected between point 17 and terminal 12 to bleed off the small cathode current still flowing through the triodes 13 when their grides are at a nominal "cut-off" negative potential.

With regard now to the mode of operation of this system, which will of course be initiated by start switch means, not shown, the parameters are such that triode 13 will initially be conductive and offer low resistance to the current for charging the particular preselected capacitors of the group 23. The charging current proceeds from triode 13 through rectifier 20, primary 21, wire 22, the selected capacitor or capacitors of group 23, wire 38, and return wire 40 to the source at terminal 12. By virtue of shunt rectifier 63, across transformer secondary 62, the transformer will not impede the current through the primary 21 in this forward or changing direction. The thyratron 51 is initially non-conducting, but current will also flow through the divider 48, 49 and 50 and at the occurrence of a predetermined drop therein, the diode 58 permits low resistance reverse flow which leassens the negative grid potential enough for the thyratron to fire. When the thyratron 51 thus conducts, the current through its plate resistors, to which grids 18 of triode 13 are tapped, procures a drop sufficient to drive such grids to negative cut-off potential and the charging circuit is thereby interrupted. In other words, the thyratron circuit thus serves to limit the charge of the capacitor grouping 23, with this condition illustrated by the flat tops 71 of the FIG. 2 diagram. This feature of limiting the charge is highly desirable, since it protects against damage due to excessive charging in the event that discharge at the tool does not occur at the proper time, for example, by miss of the spark-initiating work contact in a given cycle. It will be noted that the point 59 on divider resistor 48 is adjustable to determine the trigger voltage for the thyratron 51 and the triode grid connect at contact 69 is also adjustable to provide the proper bias for the above-described action.

Figure 3:
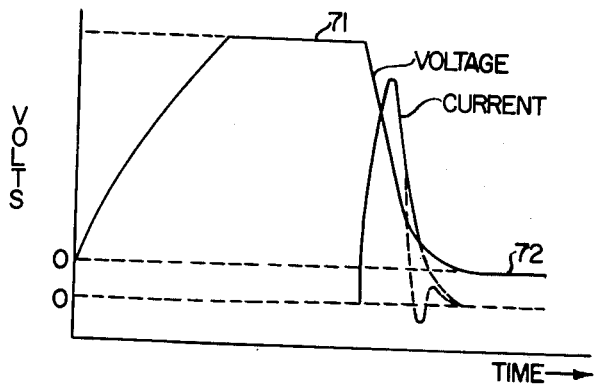
FIG. 3 is a further chart in which the voltage and current during discharge are shown.

When the electrode 2 contacts the work 5 for the spark-discharge therebetween, the discharge current must flow through primary winding 21 and the silicon diode 47. The latter has a non-linear forward resistance characteristic and is, of course, in a discharge circuit including inductance and capacitance. By properly relating these parameters, the normally oscillatory discharge circuit can be rendered non-oscillatory before the voltage and current are reduced to zero, and a current curve during discharge obtained as shown in FIG. 3 wherein the current gradually and without oscillation tapers off to zero. Such operation is realized by selecting values so that the square of the resistance of the silicon diode discharge circuit is less than four times the inductance over the capacitance in the early part of the discharge interval, this being the condition for oscillation, with the resistance of the diode increasing sufficiently according to its non-linear characteristics as the current and voltage decline to the point where its resistance squared is greater than the other part of the above relation, whereby the circuit becomes non-oscillatory, before the end of the discharge interval.

It will be appreciated that this employment of a non-linear resistance in the circuit very effectively blocks or precludes the reverse oscillation and its deleterious effects noted earlier. The plot shown simply in FIG. 3 has been confirmed by oscilloscope examination and, by the same means, the curve in a circuit lacking the foregoing relationships has appeared as shown by the dashed lines. The silicon diode is preferred since its forward resistance at the preferred voltage levels early in the discharge, viz., 70–25 volts, is extremely low, so that speed is not impaired nor is it necessary to use higher power levels which could result in excessive heating and consequent damage of the work. The resistance of such diode increases very rapidly with decline to a few volts and becomes infinite for practical purposes at values under one-half volt.

Accordingly, the illustrated and described circuit is definitely oscillatory for fast initial discharge, in the effective portion of the cycle, and yet highly damped or non-oscillatory during the latter, less important portion. This diode absorbs the inductive energy and no back discharge occurs.

Figure 2:
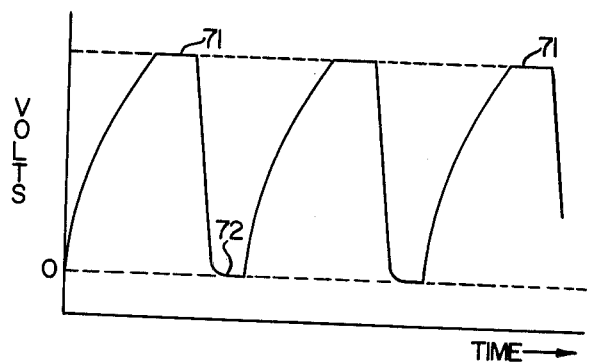
FIG. 2 is a chart of the capacitor voltage in operation of such system.

Another feature of the new circuit is the inclusion of means for blocking the charging circuit for a predetermined interval between successive cycles, the effect being shown by the curve portions 72 in FIG. 2. It will be seen that the discharge current through the transformer primary 21 causes the secondary capacitor 64 to become charged. After discharge of the load or work capacitance from the group 23, the charge which has accumulated on the capacitor 61 is dissipated through the thyratron plate resistors 53 and 54 and the voltage therein drops to stop conduction of the thyratron. The charge on capacitor 64 similarly is dissipated in its shunt resistor 65, and the component values are selected so that the extinguishment of the thyratron occurs before the capacitor 64 and resistor 65 circuit times out. Until this last condition, the grids of triode 13 remain blocked, whereby recharging is delayed and arcing eliminated.

It is to be noted that the arc-eliminating blocking thus provided is responsive to the main discharge, that is, it does not result from arbitrary timing, but is actually a function of the discharge. Accordingly, both the action and its proper time occurrence in the cycle are in assured relation to the extent that a faulty or erratic main discharge will not interfere with the blocking. In contrast, with a programmed, non-dependent attempt at blocking, one discharge might not be sufficient for firing, for example, over a relatively long gap, and firing on a succeeding pulse could occur during discharge near the end of the pulse with arcing.

Other modes of applying the principle of the invention may be employed, change being made as regards the details described, provided the features stated in any of the following claims or the equivalent of such be employed.

I, therefore, particularly point out and distinctly claim as my invention:

1. In electrical spark discharge apparatus for percussion welding and the like, including a pair of electrodes one of which is formed by the workpiece, capacitor means for receiving the charge to be applied by discharge thereof to the electrodes for creation of the spark, a charging circuit for said capacitor means including current control means, and adjustable means responsive to charging of the capaictor means for operating said current control means to interrupt the flow of current when the accumulated charge reaches a predetermined adjustable value.

2. In electrical spark discharge apparatus for percussion welding and the like, including a pair of electrodes one of which is formed by the workpiece, capacitor means adapted to receive a charge and to discharge the same through the electrodes to produce the spark therebetween, a charging circuit for said capacitor means, adjustable means for limiting the charge delivered by said circuit to the capacitor means to a predetermined adjustable value, blocking means operative when actuated to interrupt the flow of current in the charging circuit for a predetermined time interval, and means responsive to discharge of the capacitor means for initiating action of said blocking means, whereby recharging of the capacitor means following a discharge thereof is delayed by the blocking means for said interval.

3. In electrical spark discharge apparatus for percussion welding and the like, including a pair of electrodes one of which is formed by the workpiece, a capacitance adapted to receive a working charge and to discharge the same through said electrodes for creation of the spark therebetween, a charging circuit for delivering said work charge to said capacitance and a discharge circuit connecting said capacitance to said electrodes and including inductance and a nonlinear resistance device, said device exhibiting low resistance at the voltage level during the early portion of the discharge cycle, such that the circuit is oscillatory in said early portion, and considerably increased resistance at the lower voltages in the last portion of the cycle sufficient to render the discharge circuit non-oscillatory before completion of the cycle, thereby to dampen the circuit in the last portion of the cycle and preclude a pulse of reverse polarity between the electrodes following the main discharge, means for blocking recharging of the capacitance for a predetermined interval following completion of said main discharge cycle, and means for limiting the charge received by the capacitance to a predetemined adjustable value.

4. Electrical spark discharge apparatus as set forth in claim 3 wherein the means for blocking recharging of the capacitance is responsive to occurrence of the main discharge thereof.

References Cited by the Examiner
UNITED STATES PATENTS

| 2,773,168 | 12/56 | Williams | 219–113 X |
| 2,835,784 | 5/58 | Williams | 219—69 |
| 2,998,561 | 8/61 | Rockafellow | 219—113 X |
| 3,024,406 | 3/62 | Porterfield | 219—69 X |
| 3,089,059 | 5/63 | Porterfield | 219—69 X |

RICHARD M. WOOD, *Primary Examiner.*

JOSEPH V. TRUHE, *Examiner.*